UNITED STATES PATENT OFFICE.

HAROLD MILLS CLIFFORD, OF WESTMINSTER, ENGLAND, ASSIGNOR TO CORK ASPHALT LIMITED, OF LONDON, ENGLAND, A COMPANY.

MANUFACTURE OF BLOCKS, PLATES, AND OTHER ARTICLES FOR USE IN ROAD-MAKING, BUILDING, AND FOR SIMILAR PURPOSES.

No. 917,004.    Specification of Letters Patent.    Patented April 6, 1909.

Application filed October 15, 1906. Serial No. 339,146.

*To all whom it may concern:*

Be it known that I, HAROLD MILLS CLIFFORD, a subject of the King of England, residing at 25 Victoria street, in the city of Westminster, England, gentleman, have invented certain new and useful Improvements in the Manufacture of Blocks, Plates, and other Articles for use in Road-Making, Building, and for Similar Purposes, (for which I have applied for a patent in England, and which application is dated September 27, 1906, No. 21,437,) of which the following is a specification.

This invention relates to improvements in the manufacture of blocks or plates for use in road-making or building, as brake blocks (for use on vehicles for instance), in making conduits for electric wires and for numerous other purposes.

The use of bitumen mixed with various other substances—cork and so forth—in such manufacture is well known, but the process hereinafter described yields a material that is far superior to anything yet produced from bituminous mixtures.

In making bituminous blocks, plates, and so forth by the known methods, material has been produced which, though possessing many desirable qualities, nevertheless was either not perfectly homogeneous or too loose in structure, or too costly. Some methods hitherto known produced materials which it was difficult or impossible to prepare at a factory and then to transport in a condition for immediate use, without difficult or tedious manipulation at the place where the material is ultimately to be employed. The present process however yields a material that is formed into blocks, plates, sheets, or into other convenient articles at the factory. The goods so made can be transported without any further preparation. They will be of great density, comparatively speaking light; impervious to moisture and not readily affected by atmospheric or other injurious influences.

The essential features of the process are:—

1. The materials are mixed while cold.
2. The mixed materials are heated to the temperatures hereinafter stated, and molded in that state. They then become a plastic mass in which the bitumen causes the whole to cohere.
3. The freshly-molded, heated mass is subjected to high pressure in the molds and the pressure is maintained from the moment when the mold has been filled until the mass has completely set and cooled.

The process is hereinafter set forth as applied to the manufacture of blocks, slabs for paving streets or roads, for use in building and so on but it will be self-evident that variation in the shape of the molds will result in the production of a large variety of articles, also that the pressure used is varied according to the nature of the articles made.

The materials used are: for every hundred parts by weight—15 parts of cork. 15 parts of sawdust. 70 parts of hard, brittle, refined bitumen (asphaltum) containing little or no bituminous oil. These proportions may be varied, but any substantial departure therefrom is undesirable. For the cork or sawdust, other materials may be in part or wholly substituted, such as cocoanut fiber.

The cork may be waste cork; the sawdust and cork should be clean, *i. e.* free from any notable admixture of sand, dirt, or other foreign substances. The cork is ground so as to pass through a sieve, preferably of 2 to 3 millimeter mesh, and mixed with the sawdust. The bitumen is by any suitable crushing, disintegrating, or grinding machine reduced to granules that will pass through a sieve of preferably 3 to 6 millimeter mesh. The materials are then thoroughly mixed while cold and in the proportions hereinabove named. Care should be taken to mix well, so as to obtain a uniform distribution of the component parts throughout the mixture. This mixture is now heated with constant stirring, say in open steam-jacketed troughs fitted with stirrers. The temperature must not be below 130° C., but it is preferable to heat from about 140° to 150° C. When by these means a thoroughly plastic mass, uniform in composition throughout, has been obtained, the temperature is allowed to fall to 110°, to 125° C., and the mass is then filled into molds. In the molds it is subjected to a pressure of 100 to 120 kilograms per square centimeter for ordinary road paving blocks, the temperature being maintained until the pressure has been applied. The mold being closed under pressure, there is no need further to maintain the heat. The pressure however has to be maintained until the block, or the like, has thoroughly cooled. The pressure is then removed, the article is taken out of the mold, and will be found to be light, strong, and capable of very great resistance to wear as well as to atmospheric influences, putrefaction, and so on.

The temperatures above given should be closely adhered to, as they will free the material from undesirable volatile constituents, without inducing detrimental chemical changes. The pressure however may be materially increased if a particularly dense or hard product is desired, or reduced for cheaper or lighter material.

The proportions of the materials may also be varied to some extent, though those above given are particularly desirable. It should be borne in mind in making variations that an excess of sawdust, or a deficiency in bitumen, will tend to diminish the cohesion of the material, while an undue preponderance of cork will render the surface absorbent when wear begins to affect it.

Claims.

1. A process for manufacturing blocks, plates and other articles consisting in mixing in the cold state bitumen cork and sawdust, then making the mixture plastic and at the same time freeing it from volatile oil by heating to at least 130° C. with constant stirring and molding the resulting plastic mass.

2. A process for manufacturing blocks, plates and other articles consisting in mixing bitumen in the cold state with granular material also in the cold state, heating the mixture, compressing the hot mixture in molds and cooling while the pressure is maintained.

3. A process for manufacturing blocks, plates and other articles consisting in mixing in the cold state bitumen with cork and sawdust then making the mixture plastic and at the same time freeing it from volatile oil by heating to at least 130° C. with constant stirring, compressing the hot oil-free mixture in molds and cooling while the pressure is maintained.

4. A new composition of matter consisting of bitumen made oil free by heat and partly penetrating the granular material and cementing the granules together.

5. A new composition of matter for use in road making, building and for other technical purposes consisting of 70 parts by weight of oil-free bitumen 15 parts by weight of granulated cork and 15 parts by weight of sawdust partly penetrated and cemented together by the bitumen.

In testimony whereof I have hereunto set my hand in the presence of two witnesses.

HAROLD MILLS CLIFFORD.

Witnesses:
G. F. WARREN,
BERNHARD DUKES.